UNITED STATES PATENT OFFICE.

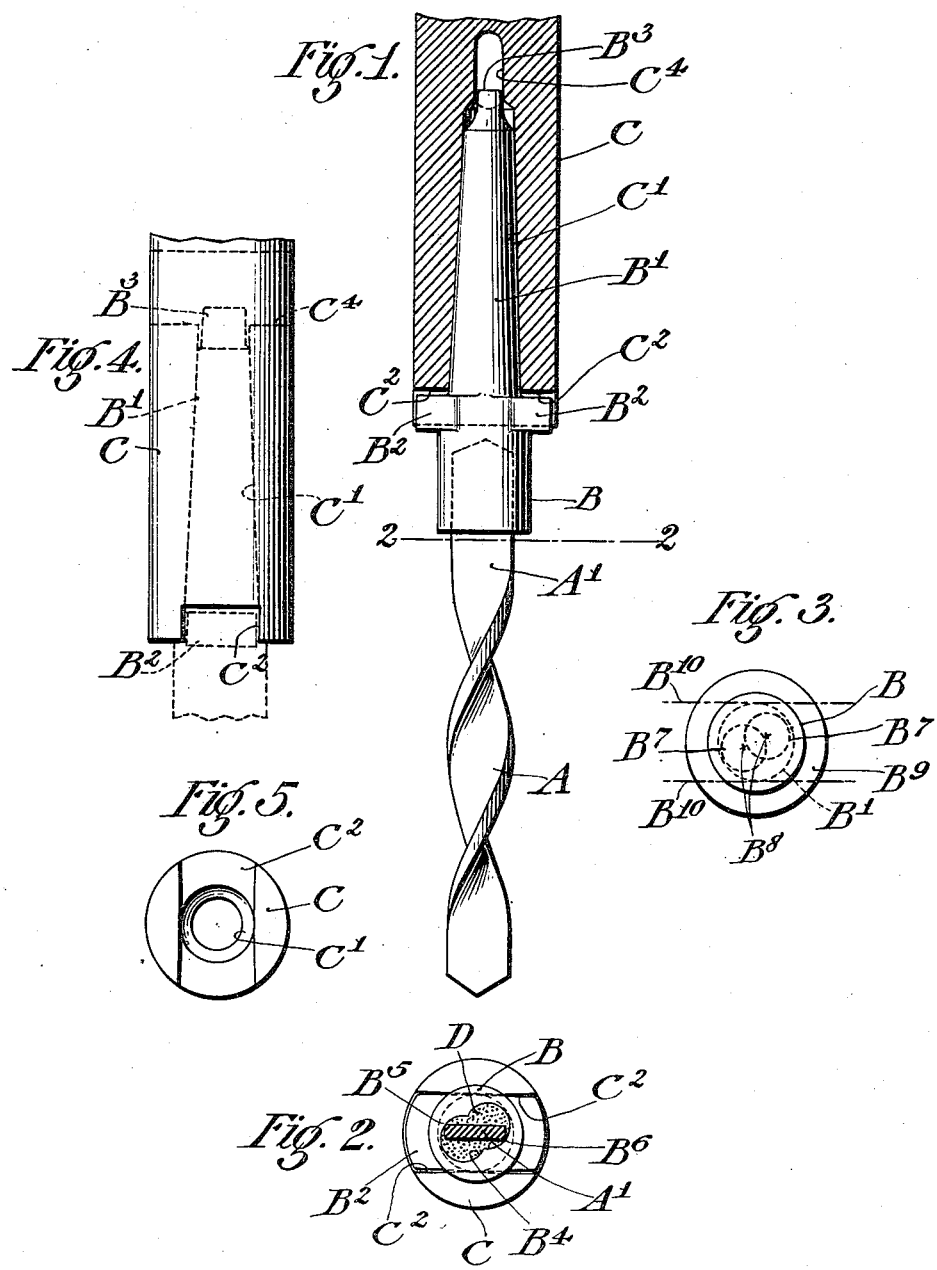

SIDNEY NEWBOLD, OF PHILADELPHIA, PENNSYLVANIA.

DRILL.

993,395.  Specification of Letters Patent.  Patented May 30, 1911.

Application filed February 16, 1909. Serial No. 478,282.

*To all whom it may concern:*

Be it known that I, SIDNEY NEWBOLD, a citizen of the United States of America, residing in the city and county of Philadelphia, in the State of Pennsylvania, have invented a certain new and useful Improvement in Drills, of which the following is a true and exact description, reference being had to the accompanying drawings, which form a part thereof.

The present invention relates to the construction of drills or boring tools, and especially to drills of the kind in which the bit or cutting portion of the drill is formed of so called high speed tool steel, and is secured by a soft metal filling in a cavity in the end of the body forming the shank of the tool.

The main object of the present invention is to provide a shank construction of such a character that the cutting portion of the tool may be anchored therein in such fashion and the shank may be connected to the drill spindle in such manner that the tool will satisfactorily resist the very severe strains incident to its use with efficient cutting speeds, while at the same time the construction is relatively simple and compact and inexpensive to manufacture.

A further object of the invention is to so shape a tool shank having the characteristics referred to that it may be satisfactorily connected in place in a drill spindle of standard construction without requiring any change in such a spindle other than a slight one, which can be made in existing drill spindles with little trouble and at slight expense and without interfering in any way with the use in the spindle of tools having shanks of the common form heretofore used.

The various features of novelty which characterize my invention are pointed out with particularity in the claims annexed to and forming a part of this specification. For a better understanding of the invention, however, and the advantages possessed by it, reference may be had to the accompanying drawings and descriptive matter, in which I have illustrated and described one of the forms in which the invention may be embodied.

Of the drawings: Figure 1 is an elevation of a tool and spindle in which the tool is held, the drill spindle being partly broken away and in section. Fig. 2 is a section on the line 2—2 of Fig. 1. Fig. 3 is a plan view of a partially formed tool shank blank. Fig. 4 is an elevation of a portion of the socket taken at right angles to Fig. 1; and Fig. 5 is an inverted plan view of the socket shown in Fig. 4.

In the drawings, A represents the bit or cutting portion proper of the tool, preferably formed out of the material well known as high speed tool steel. The bit shown is shaped by twisting the major portion of a flat bar of greater width than thickness to give it the shape illustrated, the shank entering end $A^1$ of the tool being left untwisted.

The shank portion of the tool comprises a cylindrical portion B, a tapered or conical portion $B^1$ which enters the usual tapered socket $C^1$ formed in the drill spindle C, and portions $B^2$ which project away from the shank adjacent the lower end of the cylindrical portion B and the base of the conical portion $B^1$. The lateral projections $B^2$, which are diametrically opposed, enter the ends of a slot $C^2$ formed in the spindle C when the tool is in place in the spindle. As shown clearly in Fig. 2, the cavity $B^4$ is of a cross-section different from and larger than the cross-section of the tool end $A^1$ and only the edges of the latter engage the side wall of the cavity or socket at $B^5$ and $B^6$.

D represents the soft or fusible metal filling which is employed to anchor the end $A^1$ of the bit in the socket $B^4$ of the shank member.

By preference, the cavity $B^4$ is formed as shown in Fig. 3 by drilling a pair of parallel intersecting holes $B^7$ (indicated by dotted lines in Fig. 3) in the end of the portion B of the shank, these holes being of the same diameter and having their centers $B^8$ separated by a distance slightly less than the diameter of either hole. The projections $B^2$ are also preferably formed as indicated in Fig. 3 by first forming a collar $B^9$ (see Fig. 3) on the shank and then milling or otherwise dressing off the segments of these collars lying to the lines $B^{10}$ of Fig. 3. By forming the tool shank in this manner, the shank may be formed from stock of circular cross-section and all of the forming operations thereon may be carried out in a turret-lathe or screw machine, except that of forming the flat sides of the lateral projections $B^2$.

The drill spindle C may be of the standard form, except for the slot $C^2$ receiving the lateral projections B². It will be readily observed that this slot may be milled or otherwise cut into an existing drill spindle of standard form to adapt the spindle to receive my new tool at a slight expense of time and labor. The tool is centered by the engagement of the conical portion B¹ with the socket C¹, and clearance as shown should be left between the bottom of the slot C² and the projections B².

The construction described above is well adapted for the purpose for which it is devised. The lateral projections B² are calculated to receive and transmit the enormous torque required to operate a tool of the character shown at efficient cutting speeds. Some appreciation of this torque will be had when it is realized that it is now not uncommon practice to drill a hole one inch in diameter and eight inches deep in cast iron in one minute. With the standard drill shank heretofore employed wherein the small end of the conical portion of the shank is flattened and received in the usual flattened portion C⁴ of the spindle socket, difficulty has often been experienced from the distortion or rupture of this flattened portion of the shank under the stresses experienced in such standard drill shanks. With my new construction, however, the lateral projections may be readily made strong enough to stand up under the load imposed upon them. The provision of the lateral projections B² at or adjacent the base of the conical portion B¹ of the shank permits of a shank construction which is practically rigid or unyielding under the stresses acting on it, without making the tool as a whole too bulky or heavy. The absence of torsion in the shank is of peculiar importance in a tool of the character described, wherein the bit end A is anchored in place by soft metal, since where there is torsion in the bit holder, the bit is more apt to work loose or become displaced than where the holder is rigid and unyielding.

The tool as a whole is characterized by its simplicity, compactness, mechanical strength and inherent low cost of manufacture.

While the form of tool shown is the best now known to me, it will be apparent to those skilled in the art that some changes may be made without departing from the spirit of my invention and that some features of the invention may be used in some cases with advantage without a corresponding use of other features.

Having now described my invention, what I claim as new and desire to secure by Letters Patent is:

1. In combination a drill having a shank provided with a conical centering portion and lateral projections adjacent the base of said conical portion, and a drill spindle having a conical socket, receiving said centering portion, and a slot in its end receiving said projections, said slot being deep enough so that its bottom wall clears the adjacent edges of said projections.

2. In combination, metal cutting drill bit and shank members, said shank member comprising a body portion formed with an opening receiving one end of said bit member and with a tapered centering portion and with external lateral projections adjacent the base of said centering portion, and a drill spindle having a conical socket receiving said centering portion and a slot in its end receiving said projections, said slot being deep enough so that its bottom wall clears the adjacent edges of said projections.

3. A metal cutting drill, comprising a bit having a bar like shank entering end of greater width than thickness, a shank having a cavity in its end to receive said bit end, said cavity being of greater cross-sectional area than the cross-sectional area of the portion of the bit entering said cavity and being in the form of a pair of intersecting cylinders, the axes of which are parallel to and on opposite sides of the axis of the shank, and a soft metal filling for anchoring said bit end in place in said cavity.

4. As a new article of manufacture, a metal cutting drill comprising a bit in the form of a bar of rectangular cross-section and of greater width than thickness, having a twisted body portion and an untwisted shank entering end portion, a one-piece shank having a cylindrical body portion and a conical spindle engaging portion and having a cavity formed in one end of said body portion of the shape of a pair of intersecting cylinders to receive said bit end portion, the axes of which are parallel to and on opposite sides of the center line of the shank, and a fusible metal filling anchoring said bit in said cavity, said shank being provided with external integral projections extending from the body portion adjacent the base of said conical portion.

SIDNEY NEWBOLD.

Witnesses:
ARNOLD KATZ,
D. STEWART.